United States Patent [19]

Nonaka et al.

[11] Patent Number: 5,515,351

[45] Date of Patent: May 7, 1996

[54] METHOD AND APPARATUS FOR EXECUTING A CD PLAYBACK SETUP OPERATION IN A CD PLAYER PARTICULARLY SUITED TO PLAYBACK OF PARTIALLY RECORDED CDS

[75] Inventors: Yoshiya Nonaka; Yoshio Aoyagi; Hiroyuki Abe; Chiaki Hirano; Kiyoshi Furukawa; Alex Bradshaw; Kazuhiro Kiyoura; Seiji Kato; Koichiro Haraguchi, all of, Kawagoe, Japan

[73] Assignee: Pioneer Electronic Corporation, Tokyo, Japan

[21] Appl. No.: 368,665

[22] Filed: Jan. 4, 1995

Related U.S. Application Data

[62] Division of Ser. No. 7,872, Jan. 22, 1993, Pat. No. 5,414,684.

[30] Foreign Application Priority Data

Jan. 24, 1992 [JP] Japan ..................... 4-11436
Jan. 24, 1992 [JP] Japan ..................... 4-11441

[51] Int. Cl.⁶ ..................................................... G11B 7/00
[52] U.S. Cl. .......................... 369/58; 369/54; 369/44.27
[58] Field of Search .................. 369/58, 54, 47, 369/48, 50, 53, 44.27, 44.28, 116, 44.32

[56] References Cited

U.S. PATENT DOCUMENTS 5,226,027   7/1993   Bakx ........................................ 369/58

Primary Examiner—Georgia Y. Epps
Assistant Examiner—P. W. Huber
Attorney, Agent, or Firm—Sughrue, Mion, Zinn, Macpeak & Seas

[57] ABSTRACT

Disclosed is a CD player that ensures a setup operation and reproduction of information even when a partially recorded CD-R is set therein. The CD player sequentially performs the setup operation, starting from the first setup position located at the innermost periphery of the CD, predetermined for the setup operation, until the setup operation is complete at any of n-th (n=2, 3, ...) setup positions lying outwardly of the first setup position. If the setup operation is not completed even at an n-th setup position located at the outermost periphery of the CD, the CD player performs the setup operation again at at least one setup position lying inwardly of the n-th setup position. Also disclosed is a CD player that can discriminate a partially recorded, additionally recordable CD-R, and can execute the reproduction control for the PRD. This CD player discriminates a set disk as an additionally recordable one when a mirror-finished portion is detected in the control to detect the lead-in area or when the lead-in area cannot be detected and the TOC information cannot be read.

8 Claims, 9 Drawing Sheets

CD

CD-R BLANK DISK

CD-R PARTIALLY RECORDED DISK (PRD)

CD-R FINALIZED DISK

METHOD AND APPARATUS FOR EXECUTING A CD PLAYBACK SETUP OPERATION IN A CD PLAYER PARTICULARLY SUITED TO PLAYBACK OF PARTIALLY RECORDED CDS

This is a divisional of application Ser. No. 08/007,872 filed Jan. 22, 1993, U.S. Pat. No. 5,414,684.

BACKGROUND OF THE INVENTION

1. Field of the Invention

The present invention relates to a CD (Compact Disk) player, and more particularly, to a CD player capable of playing back a partially recorded, additionally recordable CD-R (CD Recordable).

2. Description of the Related Art

The CD is well known as a recording medium to record acoustic information or the like. The CD has a lead-in area LIA where index information of recorded information is recorded, a program area PA where actual musical information is recorded, and a lead-out area LOA indicating the end of the program area PA, formed thereon in the named order from the inner periphery of the disk, as shown in FIG. 1(a). Those areas LIA, PA and LOA as a whole are called an information area. A signal to be recorded is a digital signal modulated by EFM (Eight to Fourteen Modulation), and includes a main code (main information) such as musical information, and a sub code such as a time code (time information). Index information called TOC (Table Of Contents) is recorded in the lead-in area LIA, and the total number of recorded information pieces (e.g., the total number of musical pieces), the total program time (e.g., the total playing time), etc. are recorded as a sub code also in that area LIA. Musical information or the like is recorded as a main code in the program area PA. A track number (TNO) indicating the number of each piece of recorded information (e.g., the music number), the program time (P-TIME) from the beginning of the track, such as the playing time of the music piece, the total program time (A-TIME) measured from the first track number (−1), such as the total playing time, etc. are recorded in the Q channel of the sub code in the program area PA. In the lead-out area LOA is recorded a lead-out code indicating the lead-out area.

In a CD player that plays back the above CD, when the CD is set, a pickup is moved to a predetermined position (home position), a setup operation is then performed to rotate the CD to make it ready for information reading therefrom, and TOC information is read from the lead-in area upon completion of the setup operation. In reading the TOC information, however, the TOC information may not be acquired due to some scratches on the disk. In such a case, information in the program area is to be reproduced without TOC information. To accomplish this reproduction, conventionally, it is discriminated whether the disk is a "normal CD with TOC" or "normal CD without TOC" based on the result of reading the TOC information, and the information on the discrimination result is stored as disk discrimination information.

FIG. 2 shows a flowchart of a process for reading TOC information in the conventional CD player. It is seen from the flowchart that conventionally, the information area is searched first for the lead-in area for a given period of time (steps S51, S52 and S53). If the lead-in area cannot be detected when the time is out, i.e., the TOC information cannot be read out, it is considered that the disk is a "normal CD without TOC" and the information to that effect is stored (step S57). When the lead in area is detected, the TOC information is read until the reading is complete or the time is out (steps S54, S55 and S56). When the time is out, or the TOC information cannot be read, the disk is considered as a "normal CD without TOC" and the information to that effect is stored (step S57). When the reading is complete, on the other hand, the disk is considered as a "normal CD with TOC" and the information to that effect is stored (step S58). The disk discrimination information thus acquired and stored will be used in later processes such as information searching.

While a CD having the above-described recording format is a read-only recording medium, an additionally recordable CD-R having the same format as the CDs has been developed recently. This CD-R recording format standard is standardized into a so-called "Orange Book", and conforms to the CD format standard (called a "red book"). The CD-R disks are classified into the following three types as shown in FIG. 1(b) to FIG. 1(d) depending on the recording status.

FIG. 1(b) shows a section of a blank or unrecorded CD-R disk where no information has been recorded yet. FIG. 1(c) shows a section of a partially recorded CD-R disk (hereinafter referred to as "PRD") where information is partially written. FIG. 1(d) shows a section of a finalized CD-R disk for which recording is complete and which has finally been formatted in nearly the same format as CDs.

As illustrated in FIG. 1(b) to FIG. 1(d), the lead-in area LIA, program area PA and lead-out area LOA are also formatted on each CD-R in the same manner as that of CDs.

A pregroove is formed on the recording track of a CD-R, and it is wobbled by a frequency that is acquired through FM modulation of a carrier with data indicating the absolute time information (ATIP: Absolute Time In Pregroove). In a CD-R recording and playback apparatus, the tracking control and spindle control are performed according to the pregroove so that information is recorded on and read from a blank disk as well as a PRD. A PMA (Program Memory Area) as a temporary TOC area to store the recording history of recorded information is provided on the PRD at the inner periphery side of an area I that is reserved for the lead-in area LIA as indicated in FIG. 1(c). In this PMA the following three types of information are recorded. The first information includes the start and end addresses of information recorded in the program area, which are recorded in the same format as TOC information that is recorded in the lead-in area. The second type is disk identification information (optional) which may be 6-digit numeral information to identify a disk as needed. The third type is skip command information and skip release information, which are associated with a command to skip the recorded information piece (track) by piece or part of each piece (track) of the recorded information (time designatable in the latter case) at the time of playing back the disk. The reason for recording such information as temporary TOC in the PMA is that since information is writable in the remaining program area PA on the PRD, TOC information cannot be recorded in the lead-in area LIA until the finalization of recording is instructed finally.

In a PRD, no information is written in an area I for the lead-in area LIA and an area O for the lead-out area LOA. Therefore, those areas remain in a mirror-finished state. When a command for finalization is given, the CD-R recording apparatus records predetermined information and TOC information recorded in the PMA as a sub code in the area I for the lead-in area LIA, and records a predetermined lead-out code indicating the lead-out area LOA in the area O for the lead-out area LOA in order to provide the same format as that of CDs at last. This allows the conventional CD player to play back the finalized CD-R.

While the conventional CD player is capable of playing back a finalized CD-R, it Cannot reproduce reproducible information from a PRD though that information is stored in the program area PA. To describe in detail, it is so because of the following reasons. Although a PRD has TOC information recorded in the PMA provided on the inner periphery side of the lead-in area, the conventional CD player is equipped with no mechanism to access that PMA. In addition, the area I for the lead-in area LIA and the area O for the lead-out area LOA remain mirror-finished and the conventional CD player is not designed to perform the proper control on information reading from such areas so that runaway of the servo system may occur in reading information from those areas.

As a solution to this problem, like the CD-R recording and playback apparatus, the CD player may be equipped with the mechanism to access the PMA and some means to read the pregroove and perform the tracking and spindle controls. The provision of such means only for the PRD is not cost effective.

Prior to the reproduction of recorded information, the conventional CD player moves the pickup to the position corresponding to a predetermined home position on a CD in accordance with the recording format of the CD and performs a setup operation such as pull-in of a servo system. This home position is set near the boundary between the lead-in area LIA and program area PA for the conventional CD player.

However, the home position on the CD is likely to deviate depending on the precision of the mechanism of the CD player and the eccentricity of the CD. The predetermined physical home position of the pickup may not therefore correspond to the predetermined home position on the CD. With a PRD set in the conventional CD player, since no information is yet recorded in the area I for the lead-in area LIA which remains mirror-finished, the setup operation cannot be carried out when the physical home position of the pickup enters this area I. Even if the setup operation is tried again (setup retry), the physical home position of the pickup is very likely to enter the area I for the lead-in area LIA again, making it unlikely to properly finish the setup operation. Even if some information has been recorded on the CD-R, it is considered that the disk is set with the back side facing the pickup, thus terminating the reproducing operation or rejecting that disk (first problem).

There is a demand for the development of a CD player which can reproduce information from the program area simply with alteration on the control system for PRDs in order to widen the applicability of CD-Rs. As mentioned earlier, the read-only CD and the PRD have different disk formats. Therefore, the conventional CD player cannot play back a PRD by the same control as employed for CDs and needs different control. With the use of the above-described disk discrimination in the conventional CD player that determines the type of the disk depending on whether or not it has "TOC", the PRD is discriminated as a "normal CD without TOC" and this discrimination is insufficient to reproduce information from the program area of the PRD (second problem).

SUMMARY OF THE INVENTION

It is therefore a primary object of the present invention to provide a CD player which overcomes the first problem, and which can thus perform the setup operation even when a partially recorded CD-R is set therein and play back the CD-R.

It is another object of the present invention to provide a CD player which overcomes the second problem, and which can thus properly discriminate a PRD, that is, a partially recorded, additionally recordable CD-R, and can execute the reproduction control for the PRD.

To achieve the foregoing objects, according to the first aspect of the present invention, there is provided a CD player for performing a setup operation to set up a pickup and a servo system to reproduce information recorded on a CD, comprising setup control means for sequentially performing the setup operation, starting from a first setup position located at a position of the side of the innermost periphery of the CD, predetermined for the setup operation, until the setup operation is complete at any of n-th (n=2, 3, ... ) setup positions lying outwardly of the first setup position, and, if the setup operation is not completed even at an n-th setup position located a position of the side of at the outermost periphery of the CD, performing the setup operation again at at least one setup position lying inwardly of the n-th setup position.

According to the first aspect of the present invention, the setup control means sequentially performs the setup operation, starting from the first setup position (e.g., a predetermined position near the boundary between the lead-in area and program area of a CD) located at a position of the side of the innermost periphery of the CD, predetermined for the setup operation, until the setup operation is complete at any of n-th (n=2, 3, ... ) setup positions lying outwardly of the first setup position, and, if the setup operation is not completed even at an n-th setup position located at a position of the side of the outermost periphery of the CD, performs the setup operation again at at least one setup position lying inwardly of the n-th setup position. Even if the recording area is short as on a PRD having a short recording time or any two setup positions happen to lie outside the recording area due the eccentricity of the disk or the like, therefore, the setup control means can complete the setup operation.

According to the second aspect of the present invention, there is provided a CD player for discriminating a disk by control to detect the lead-in area and control to read TOC information, comprising disk discriminating means for discriminating a disk as a not finalized one when a mirror-finished portion is detected in the control to detect the lead-in area or when the lead-in area cannot be detected and the TOC information cannot be read.

When the lead-in area is detected after the setup operation and then TOC information is controllably read out, for example, the CD player of the second aspect of the present invention discriminates if the lead-in area is detected. At the same time, it is detected if the lead-in area is mirror-finished according to a predetermined decision routine in the control to detect the lead-in area. The disk discriminating means discriminates the disk to be played back as a not finalized one when a mirror-finished portion is detected in the control to detect the lead-in area. If the lead-in area cannot be detected within a predetermined period of time and the TOC information cannot be read in the TOC information reading control, the disk discriminating means also discriminates the disk to be played back as a not finalized one. When the disk is discriminated as a not finalized one in the operation to play back the disk, the proper control for that disk can be executed to play back the disk.

DETAILED DESCRIPTION OF THE PREFERRED EMBODIMENTS

Preferred embodiment of the present invention will now be described referring to FIGS. 3 through 8.

First Embodiment of The First Aspect of The Present Invention

Figure 1A:
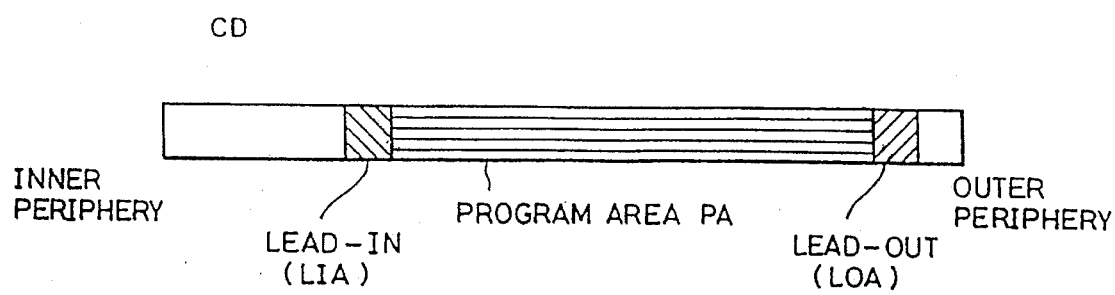
FIG. 1a–FIG. 1d are diagrams for explaining the recording formats of various disks.
Figure 1B:
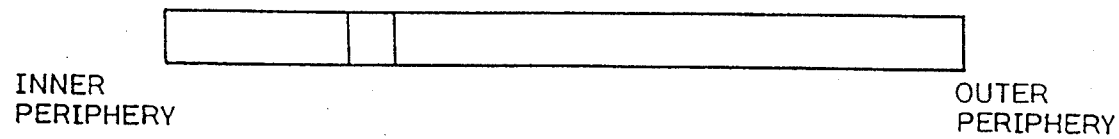
Figure 1C:
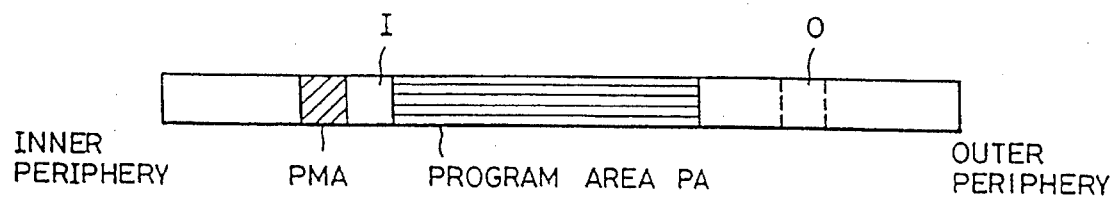
Figure 1D:
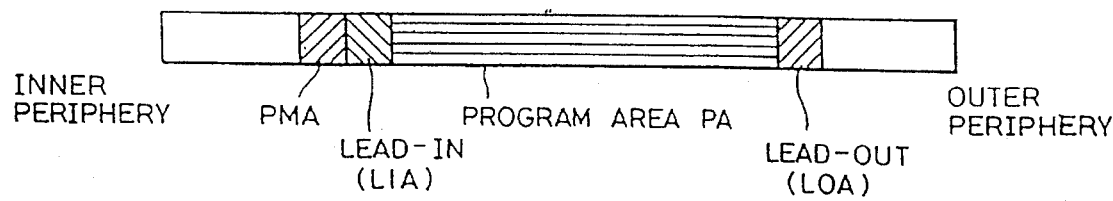
Figure 2:
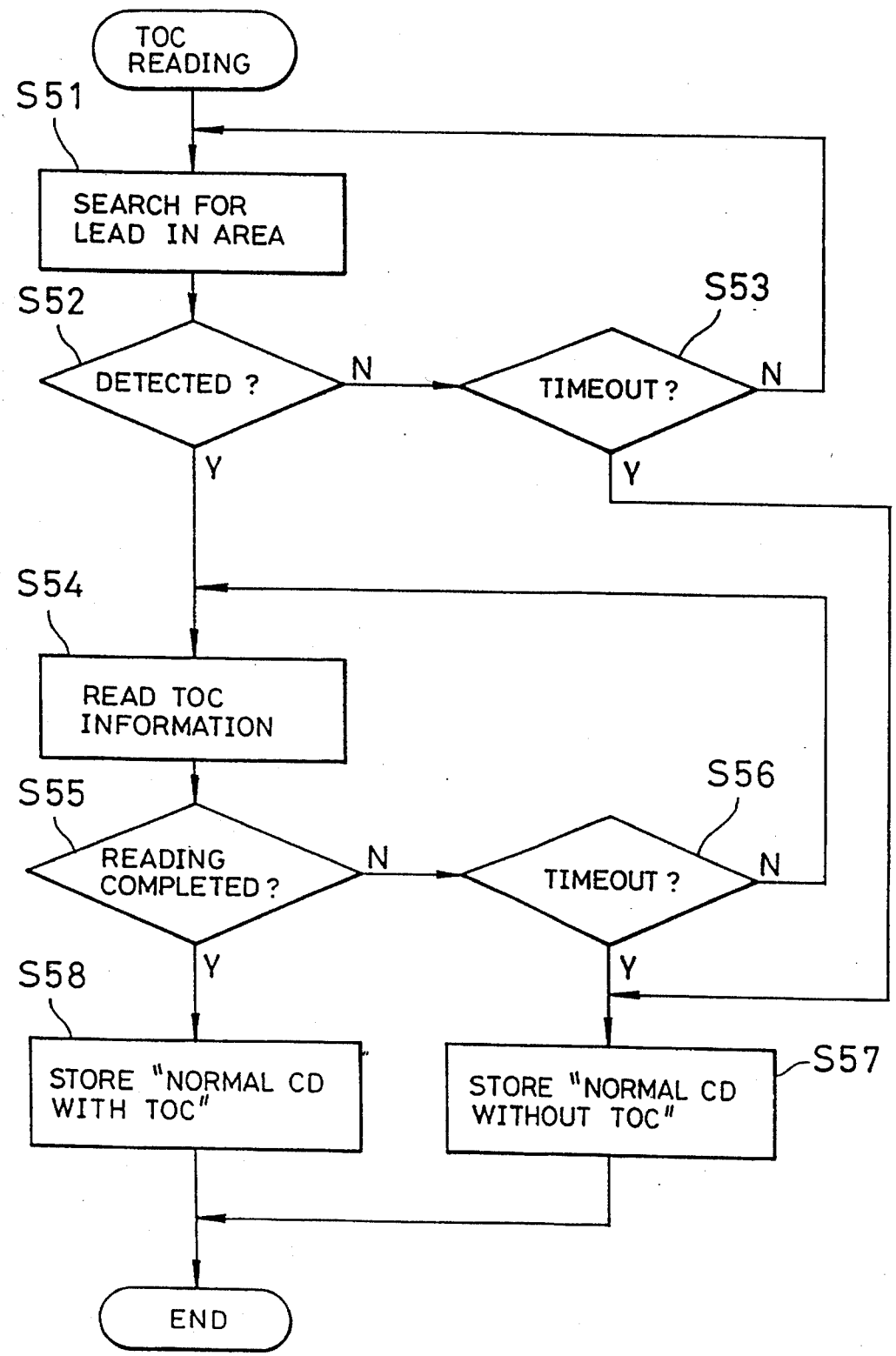
FIG. 2 is a flowchart of a disk discriminating routine in the conventional CD player.
Figure 3:
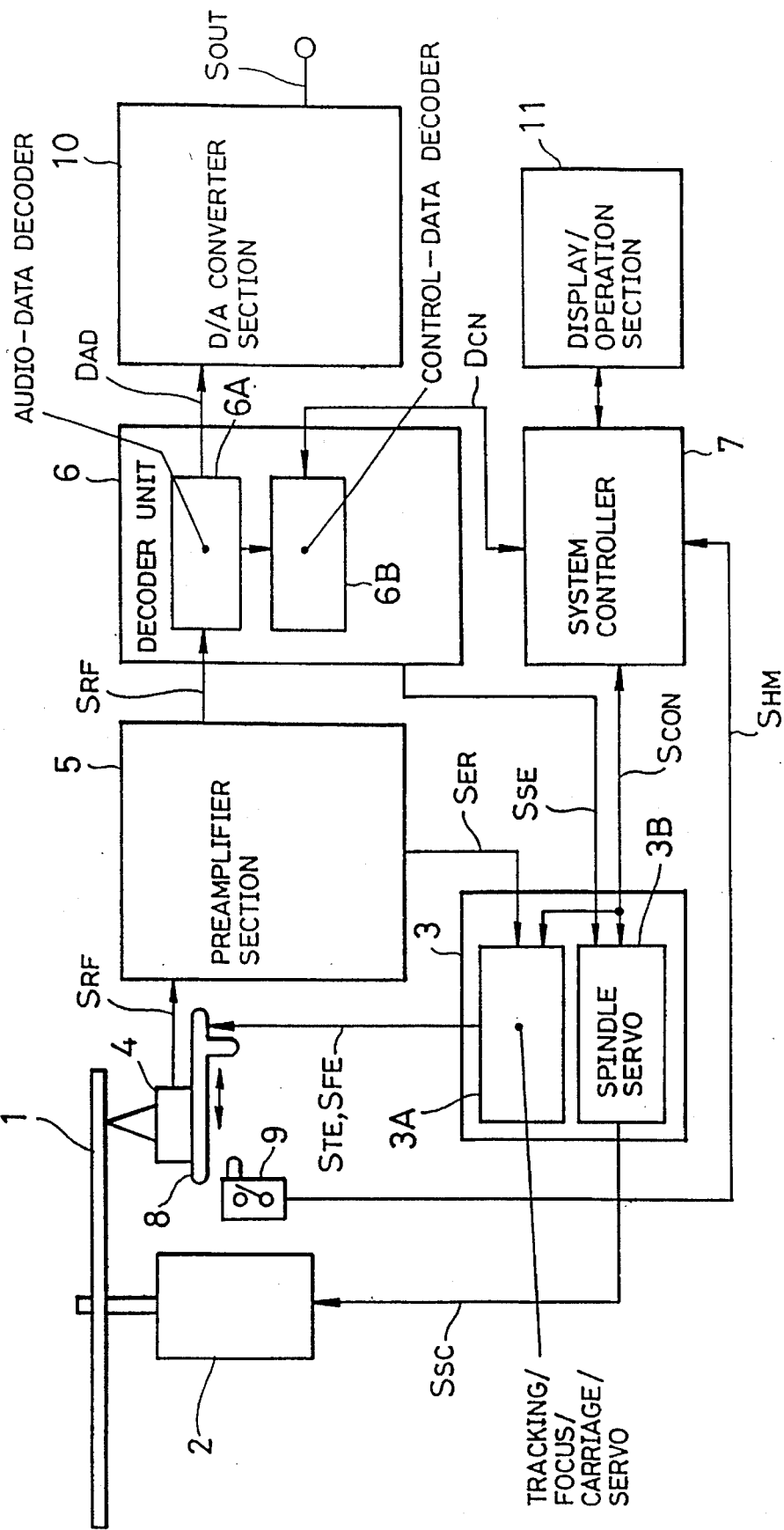
FIG. 3 is a diagram illustrating the basic structure of a CD player embodying the present invention.

FIG. 3 presents a block diagram showing the basic structure of a CD player to which the present invention is applied.

A CD (or a partially recorded or a finalized CD-R) 1 to be played back is placed on a turntable (not shown) of a CD player 100. A spindle motor 2 rotates the CD1 based on a spindle servo control signal $S_{SC}$ from a servo unit 3. A pickup 4 reads recorded data on the CD1 and outputs it as a playback RF signal $S_{RF}$ to a preamplifier section 5. The preamplifier section 5 amplifies the playback RF signal $S_{RF}$, and outputs the amplified signal to a decoder unit 6. The preamplifier section 5 also produces an error signal $S_{ER}$ from the playback RF signal $S_{RF}$ and outputs it to the servo unit 3. The servo unit 3 includes a first servo section 3A and a second servo section 3B. The first servo section 3A produces a tracking error signal $S_{TR}$ and a focusing error signal $S_{FE}$ from the error signal $S_{ER}$ and a control signal $S_{CON}$ from a system controller 7 to execute tracking servo and focusing servo for the pickup 4. The first servo section 3A also performs carriage servo to drive a carriage 8 based on the control signal $S_{CON}$ from the system controller 7 and the error signal $S_{ER}$ from the preamplifier section 5. Near the carriage 8 is provided a home position detection switch 9, which detects the home position of the carriage 8 and outputs a home position detection signal $S_{HN}$ to the system controller 7. The decoder unit 6 includes an audio-data decoding section 6A and a control-data decoding section 6B. The audio-data decoding section 6A converts the received playback RF signal $S_{RF}$ into a binary signal, separates a frame sync pattern therefrom, demodulates the signal based on the EPM (Eight to Fourteen Modulation), performs signal processing, such as error correction, on the resultant signal, and outputs audio data $D_{AD}$ to a D/A converter section 10. The audio-data decoding section 6A also outputs control data $D_{CN}$ included in a sub code to the control-data decoding section 6B. The decoding section 6B decodes the control data $D_{CN}$ and outputs the resultant data to the system controller 7. At the same time, the decoder unit 6 produces a spindle servo error signal $S_{SE}$ from the input playback RF signal $S_{RF}$ and outputs it to the second servo section 3B. The second servo section 3B serves as a spindle servo section. Based on the spindle servo error signal $S_{SE}$ and control signal $S_{CON}$, the second servo section 3B outputs the spindle servo control signal $S_{SC}$ to the spindle motor 2 to rotate the spindle motor 2 at a predetermined speed. The D/A converter section 10 converts the input audio data $D_{AD}$ into an analog signal and outputs it as an audio output signal $S_{OUT}$. The system controller 7 performs the general control of the CD player 100 based on the control data $D_{CN}$ and an operation control signal from a display/operation section 11. The display/operation section 11 is equipped with a display section (not shown) to display various types of information and inform a user of such information, and performs various displays under the control of the system controller 7.

The recording format of CDs is described in detail below.

In the format of CDs that conforms to the CD format standard (generally called "Red Book"), the information area where a recording track is formed must comply with the following regulations.

1) The lead-in area LIA shall begin within a radius of 23 mm from the center of the disk.

2) The program area PA shall start from a point 25 mm radially from the center of the disk and shall end at a point 58 mm at most radially from the center of the disk.

3) The lead-out area LOA shall be 0.5 mm wide or wider in the radial direction after the end of the program area PA.

It is apparent from the above that any CD has a track formed in an area between the radius of 23 mm and the radius of 25.5 mm, so that to invoke focus servo at the time of playing back a CD, a home position may be set in this area and a beam from the pickup my be irradiated on this home position to perform the setup operation.

Before the operational description of this embodiment, the setup operation will be described.

1) Move Pickup to Initial Position

In the setup operation, first, the pickup is moved to the initial position. For instance, if the home position is set so that the beam spot position is about 24 mm in radius from the center of the CD 1, the system controller 7 controls the first servo section 3A and drives the carriage 8 to move the pickup 4 toward the inner periphery of the CD 1. As a result, the carriage 8 is moved to the position (initial position) where the beam spot from the pickup 4 comes closer to the center of the CD 1 than the predetermined home position (about 24 mm in radius). The carriage 8 is moved by radial servo that sets the relative speed of the beam spot to the recording track in the radial direction constant. However, focus servo has not been applied yet in the above carriage movement, so that the relative speed cannot be detected and the carriage is moved at the maximum speed allowable by a carriage motor (not shown). But the carriage 8 is controlled to move for a short period of time and then be braked immediately thereafter, and to repeat this intermittent movement until it reaches the initial position.

2) Move Pickup to Activation Position

Next, the pickup 4 is moved to the activation position. This movement is done by moving the carriage 8 in the same manner as the movement to the initial position but toward the outer periphery of the CD 1 this time. It is detected that the pickup 4 has reached the activation position when the home position detection switch 9 is turned off, and then the movement to the activation position is terminated. Accordingly, the activation position comes slightly outward of the home position.

3) Activate Semiconductor Laser

When the pickup 4 reaches the activation position, the system controller 7 activates a semiconductor laser (not shown) in the pickup 4 and waits for the laser to be stable.

4) Activate Focus Servo

When the semiconductor laser becomes stable, the system controller 7 activates the focus servo.

5) Rotate Disk

Then, the system controller 7 feeds a large constant current to the spindle motor 2 via the second servo section 3B of the servo unit 3 and accelerates the rotation of the CD 1 to about 500 rpm nearly equal to the rotational speed involved in accessing the inner periphery side of the CD 1.

6) Examine pull-in of Focus Servo

Next, the system controller 7 examines if the focus servo has been pulled-in.

7) Activate Tracking Servo

When a completion of the pull-in of the focus servo is detected, the system controller 7 activates the tracking servo and carriage servo, and then examines if both servos have completed pull-in.

8) Activate Sync Servo

After the tracking servo and carriage servo have completed pull-in, the system controller 7 switches the spindle servo to sync servo, which thereafter controls the spindle motor 2 to make the rotating CD 1 have nearly the correct linear speed.

9) Lock PLL

Immediately after the sync servo is activated, the speed of the spindle motor 2 may not be the correct linear speed.

Thus, the system controller 7 detects the frame sync in the reproduced signal, and performs control based on the frame sync so that the speed of the spindle motor 2 comes within a range of several percent of the correct linear speed, and the PLL is locked in.

The setup operation is terminated after the above steps 1) to 9) are executed, and the CD player goes to the normal playback operation. The above sequence of steps is just one example of the setup operation, and is in no way restrictive.

Referring now to the operational flowchart of FIG. 4 and FIGS. 5 and 6, a description will be given of the setup routine for the CD player that is executed by the system controller 7. In this case, it is assumed that a PRD is placed on the turntable and the blank disk flag BLF indicating that the disk may be a blank disk is set to "0".

First, the system controller 7 determines whether or not TOC information has already been read (step S1).

When the TOC information has not been read in step S1, the disk is certainly a PRD, i.e., the disk is surely a PRD because the TOC information cannot be read, so that the routine goes to step S17. If the TOC information has been read in step S1, on the other hand, it is unknown If the disk is a PRD and the above-described setup operation will be performed at a normal home position $H_1$ (see FIG. 5) in step S2.

Then, it is determined based on the home position detection signal if the setup has been carried out properly (step S3). When the proper setup has been done, the setup routine will be terminated (step S19).

If the setup has not been done properly, the setup operation is performed at a position outward of the normal home position or an outer home position $H_2$ (see FIG. 5) (step S4).

Then, it is determined if the setup has been carried out properly at the outer home position $H_2$ (step S5). When the proper setup has been done, the setup routine will be terminated (step S19).

Figure 6A:
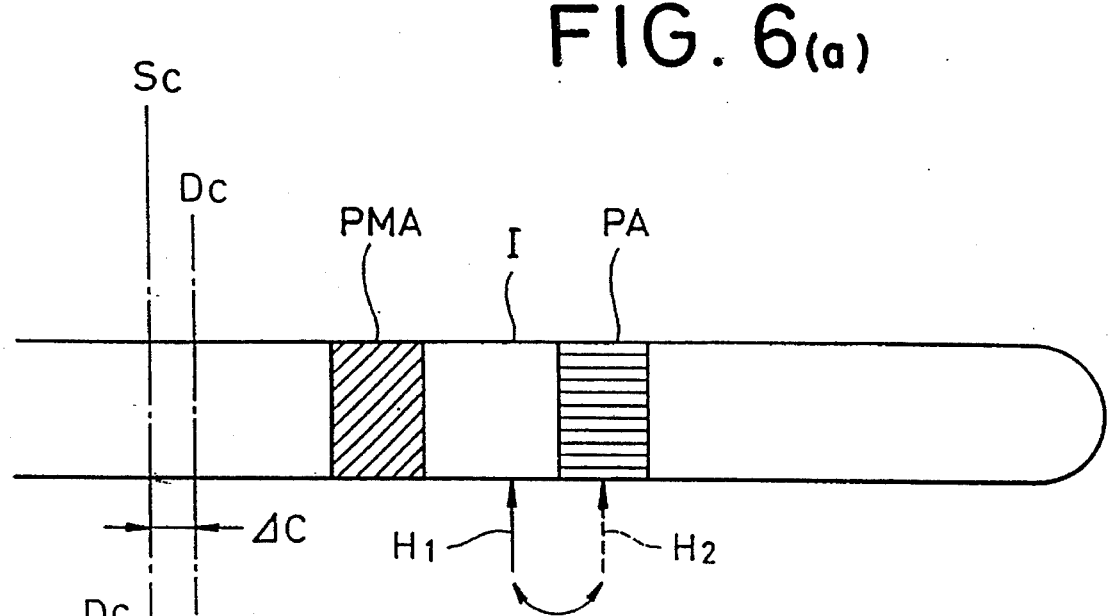
FIG. 6a and FIG. 6b are diagrams (part 2) for explaining the operation of the first embodiment of the first aspect of the present invention.
Figure 6B:
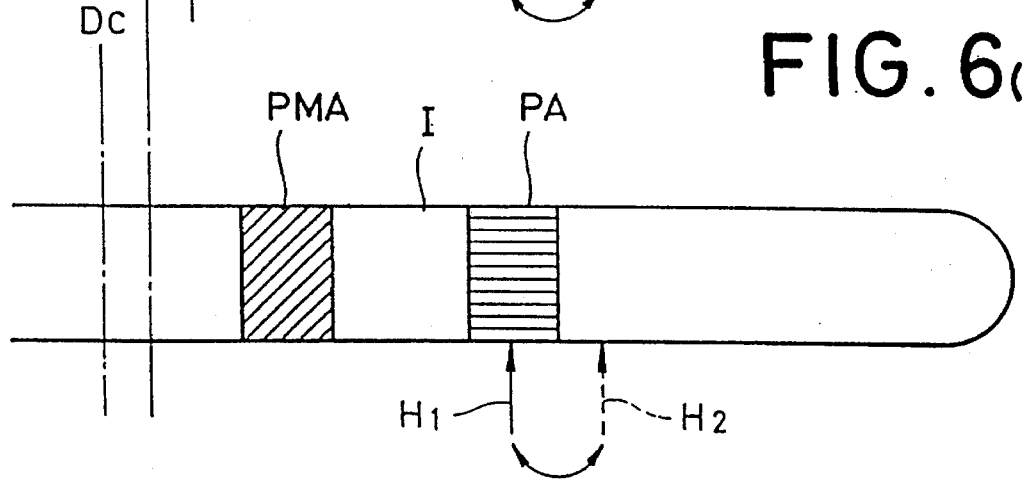

When the setup has not been carried out properly at the outer home position $H_2$, it is determined from the stored information whether or not the setup has ever been executed for this disk (step S6). When it is found that the setup has never been done for this disk, it is unknown that the disk is a blank disk, so that the setup operation will be performed again at the normal home position $H_1$ (step S7). The setup operation is retried at the normal home position $H_1$ because of the following reason. In the case where the recording time of the program area PA is short and further the center $D_C$ of the disk is shifted from (or eccentric to) the rotational center $S_C$ of the spindle motor 2 by $\Delta C$ as shown in in FIG. 6(a), if the setup operation cannot be done at the normal home position $H_1$ so that the setup operation is tarried at the outer home position $H_2$ after a predetermined period of time, the pickup 4 may be positioned beyond the recorded area of the program area PA at the outer home position $H_2$ by the rotation of the disk while the setup operation may be performed at the normal home position $H_1$, as indicated in FIG. 6(b).

If the setup has ever been executed for this disk, the disk is not a blank disk so that the routine goes to step S20.

Case A: The disk may be a blank disk

It is then determined if the setup has been carried out properly (step S8). When the proper setup has been done, the setup routine will be terminated (step S19).

When the setup has not been done properly, the blank disk flag BLF indicating that the disk may be a blank disk is set to "1" (step S9) and the setup routine enters a setup retry routine (steps S10 through S12). In this setup retry routine, it is determined how many times the retry has been done (step S10); and if it is going to be an even-numbered retry, the setup operation is performed at the normal home position $H_1$ (step S11), or if it is going to be an odd-numbered retry, the setup operation is performed at the outer home position $H_2$ (step S12).

As it is the first, odd-numbered retry in this case, the setup operation is performed at the outer home position $H_2$ (step S12).

Then, it is determined if the setup has been carried out properly at the home position (either the normal home position $H_1$ or outer home position $H_2$) (step S13). When the proper setup has been done, the setup routine will be terminated (step S22).

When it is determined in step S13 that the setup has not been carried out properly at that home position, it is determined if the blank disk flag BLF indicates "1" (step S14).

As the blank disk flag BLF=1 in this case, the flag BLF is reset to "0" (step S15) and a blank disk process such as stopping the operation or rejecting the disk is executed (step S16) before the routine is terminated (step S22).

Case B: There is no possibility that the disk is a blank disk

When step S6 yields the determination that the disk is not a blank disk, it is determined if the setup retry has already been done six times in the setup retry routine (step S20). As no setup retry has been done yet in this case, the process goes to the setup retry routine. If the setup retry has already been done six times, on the other hand, it is considered that the setup is disabled and the operation will be terminated (step S21).

In this setup retry routine, it is determined how many times the retry has been done (step S10); and if it is going to be an even-numbered retry, the setup operation is performed at the normal home position $H_1$ (step S11); or if it is going to be an odd-numbered retry, the setup operation is performed at the outer home position $H_2$ (step S12).

As it is the first, odd-numbered retry in this case, the setup operation is performed at the outer home position $H_2$ (step S12).

Then, it is determined if the setup has been carried out properly at the home position (step S13). When the setup has been done properly, the setup routine will be terminated (step S22).

When it is determined in step S13 that the setup has not been carried out properly at that home position, it is determined if the blank disk flag BLF indicates "1" (step S14).

As the blank disk flag BLF=0 in this case, the routine goes to step S20 to determine whether or not the setup retry has already been done six times (step S20). As the setup retry has been done once in this case, the process goes again to the setup retry routine. In this setup retry routine, it is determined how many times the retry has been done. As it is the second, even-numbered retry, the setup operation is performed at the normal home position $H_1$ (step S11). Then, it is determined if the setup has been carried out properly at the home position (step S13). When the setup has been done properly, the setup routine will be terminated (step S22).

When it is determined in step S13 that the setup has not been carried out properly at that home position, the sequence of steps S10 to S14 and S20 is likewise executed to perform the setup operation until the sixth setup retry is made. In the setup retry routine, therefore, the setup operation at the outer home position $H_2$ and the setup operation at the normal home position $H_1$ are executed alternately, three times at the normal home position $H_1$ and three times at the outer home position $H_2$ at a maximum. When the setup is not successful in any of the six setup operations, it is considered that the setup is disabled and the operation will be terminated (step S21).

In short, when a disk other than a blank disk is set in the CD player, the setup operation at the outer home position $H_2$ and the setup operation at the normal home position $H_1$ are alternately performed in the setup retry routine, so that it is very likely to accomplish the setup operation even if the set disk is a CD or CD-R, increasing the possibility to play back a PRD.

Second Embodiment of The First Aspect of The Present Invention

A second embodiment of this invention will be described referring to FIGS. 7 and 8. This embodiment differs from the first embodiment in that a second outer home position $H_3$ located outward of the outer home position $H_2$, as well as the aforementioned normal home position $H_1$ and outer home position $H_2$, is provided as a home position at which the setup operation is performed.

Figure 4:
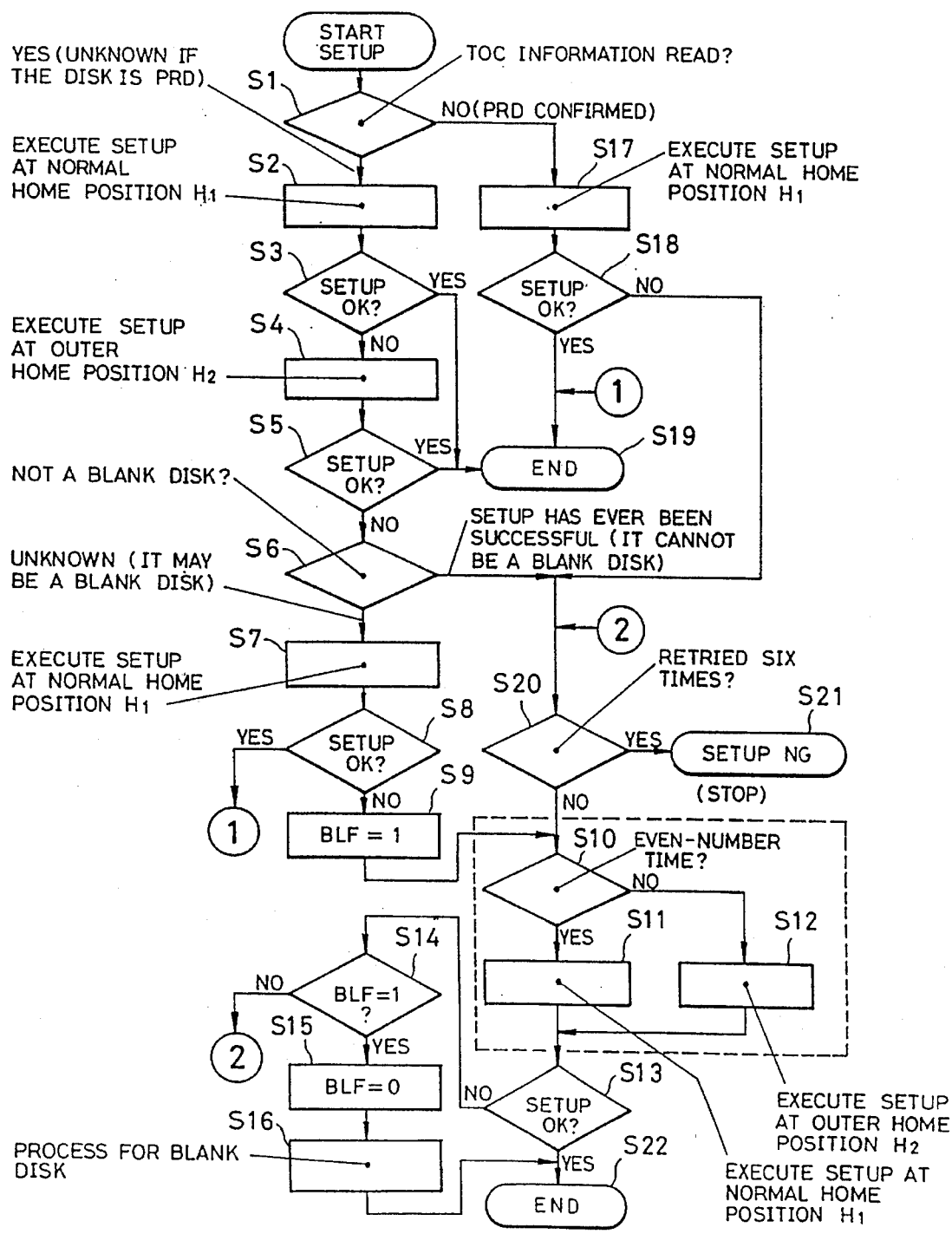
FIG. 4 presents a flowchart illustrating the operation of a first embodiment of the first aspect of the present invention.
Figure 5:
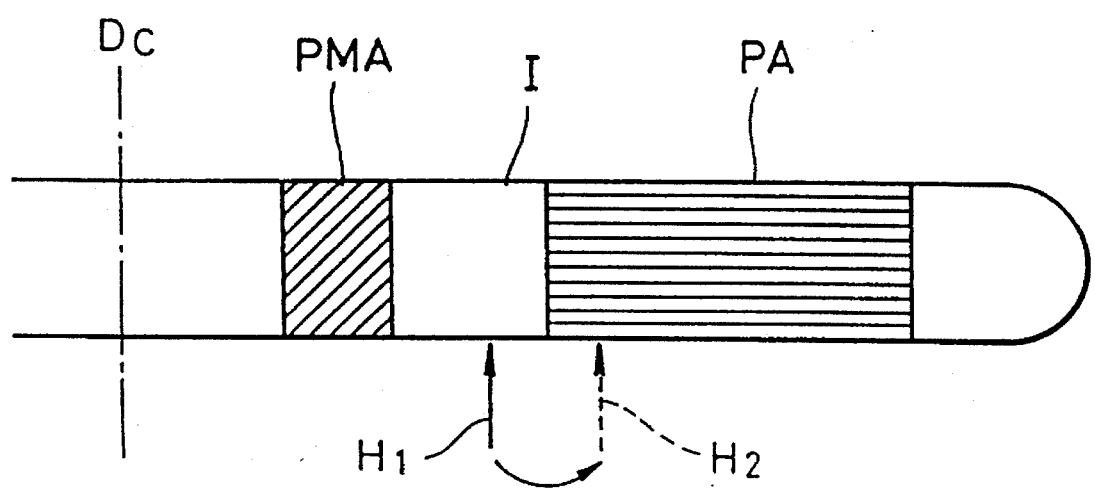
FIG. 5 is a diagram (part 1) for explaining the operation of the first embodiment of the first aspect of the present invention.
Figure 7:
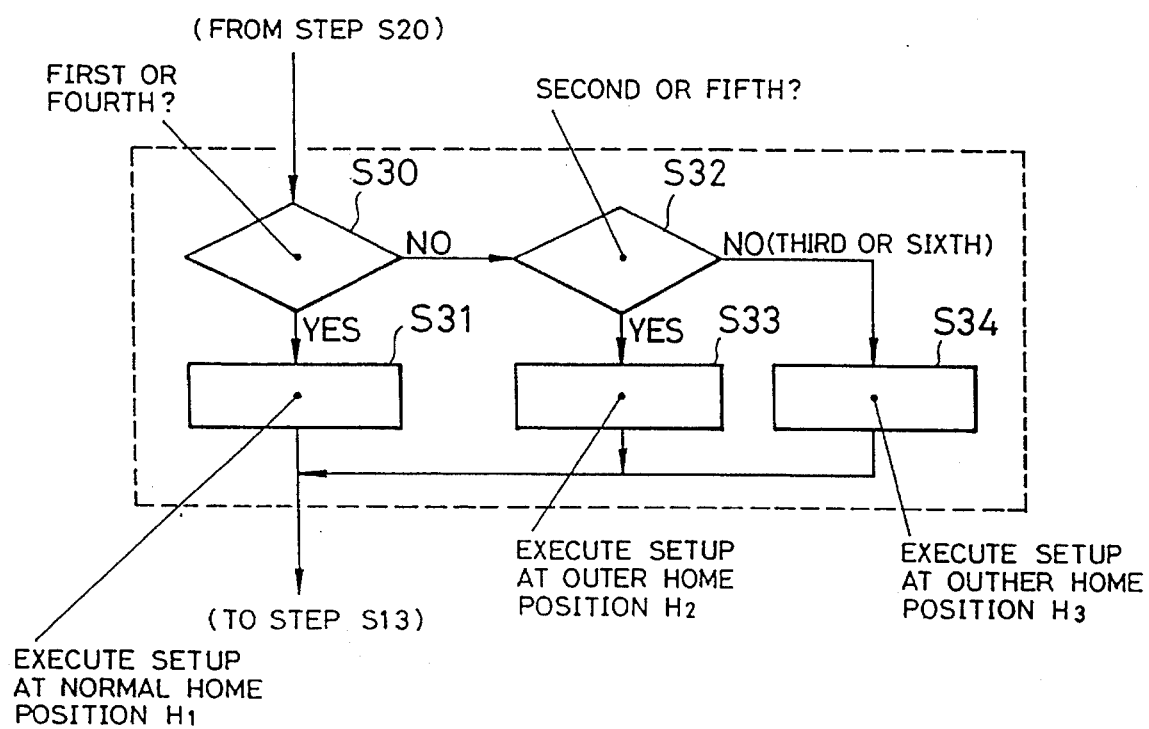
FIG. 7 presents a partial flowchart illustrating the operation of a second embodiment of the first aspect of the present invention.
Figure 8:
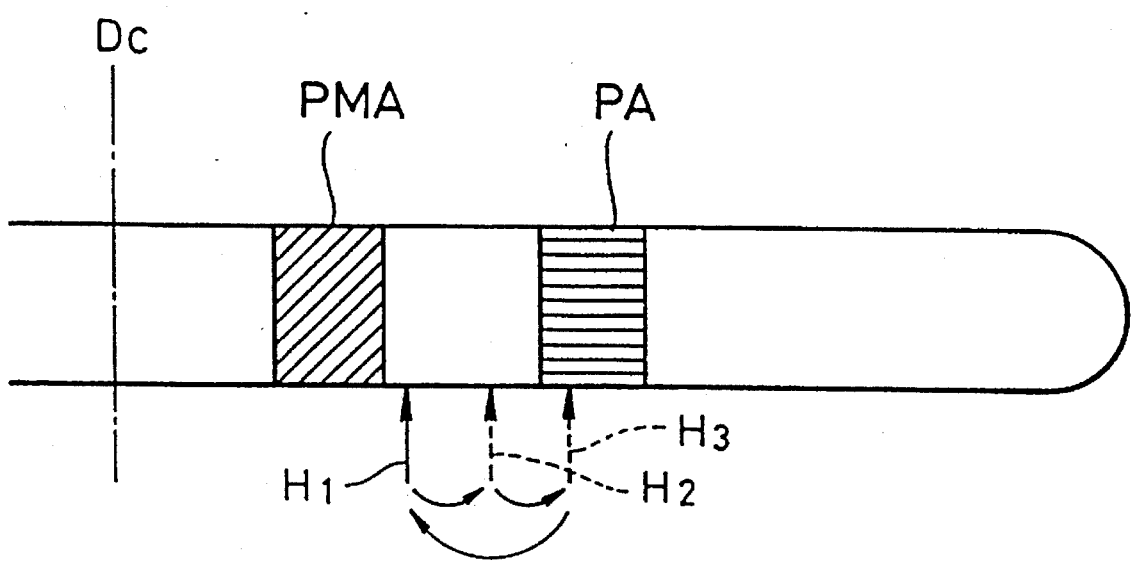
FIG. 8 is a diagram for explaining the operation of the second embodiment of the first aspect of the present invention.

FIG. 7 illustrates an operational flowchart of the part which differs from the operational flowchart shown in FIG. 4.

The operational flowchart in FIG. 7 illustrates a setup retry process that is executed instead of the setup retry routine of steps S10 to S12 in FIG. 4. According to this embodiment, as illustrated in FIG. 8, the setup operation is executed, first at the normal home position $H_1$, then at the outer home position $H_2$, then at the second outer home position $H_3$, then again at the normal home position $H_1$, and so forth. It is apparent from the diagrams that the first and fourth setup operations are performed at the normal home position $H_1$ (step S31), the second and fifth setup operations are performed at the outer home position $H_2$ (step S33), and the third and sixth setup operations are performed at the second outer home position $H_3$ (step S34). Even if a PRD is set, it is possible to accomplish the setup operation more surely, further increasing the possibility to play back the PRD.

According to the second embodiment, the setup operation is carried out, first at the normal home position $H_1$, then at the outer home position $H_2$, then at the second outer home position $H_3$, then again at the normal home position $H_1$, and so forth. However, the setup operation may be executed in an arbitrary order. Further, one or more home positions may be provided further outward of the second home position $H_3$ so that the setup operation can be executed, first at the normal home position $H_1$, then at the outer home position $H_2, \ldots$, then at the outermost home position $H_n$, then again at the normal home position $H_1$, and so forth.

Although the setup operation is performed, first at the innermost setup position, then at the second innermost setup position, ..., then at the outermost setup position, then again at the innermost setup position, and so forth in the second embodiment, the setup operation may be performed, first at the outermost setup position, then sequentially at inner setup positions. Further, the setup operation may be performed, first at the innermost setup position, then sequentially at outer setup positions up to the outermost setup position, then at those of the inner setup positions which are properly selected.

Although the number of setup retry operations is set to six in both embodiments described above, the setup retry may be performed an arbitrary number of tames equal to or greater than two.

According to the first aspect of the present invention, as described above, the setup control means sequentially performs the setup operation, starting from the first setup position (e.g., a predetermined position near the boundary between the lead-in area and program area of a CD) located at a position of the side of the innermost periphery of the CD, predetermined for the setup operation, until the setup operation is complete at any of n-th (n=2, 3, ...) setup positions lying outwardly of the first setup position, end, if the setup operation is not completed even at an n-th setup position located at a position of the side of the outermost periphery of the CD, performs the setup operation again at at least one setup position lying inwardly of the n-th setup position. Even if the recording area is short as on a PRD having a short recording time or either one of the two setup positions may not have the recording area due to the eccentricity of the disk or the like, therefore, it is possible to surely complete the setup operation. Even when a partially recorded CD-R (PRD) is set in the CD player, it is possible to surely complete the setup operation and thus play back the disk.

A preferred embodiment of the second aspect of the present invention will be described below.

Referring to FIG. 3, when the disk 1 is set, the system controller 7 first drives the carriage 8 as a servo mechanism via the servo unit 3 to move the pickup 4 to the home position set near the innermost portion of the program area. Then, the system controller 7 performs a setup operation to drive the spindle motor 2 and sequentially activate the individual servos, making the CD player ready for information reproduction. If there is a scratch at that position on the disk which corresponds to the home position, or the home position comes on the mirror-finished portion of the PRD, the setup may not be carried out. In this case, the pickup 4 is moved outward of the home position and the setup is tried again as done in the previous embodiments, allowing the information at the innermost portion of the program area to be reproduced.

When the setup is complete, a process to read TOC information is performed next. This process of reading the TOC information includes a process serving as the disk discriminating means of the present invention. That is, it is discriminated whether the disk is a "normal CD with TOC", "normal CD without TOC" or "PRD" that is a partially recorded, additionally recordable disk, based on the result of reading the TOC information, and information on the discrimination result is stored as disk discrimination information. Thereafter, when playback is instructed from the display/operation section 11, reproduction of the recorded information in the program area is controlled according to the disk discrimination information.

Figure 9:
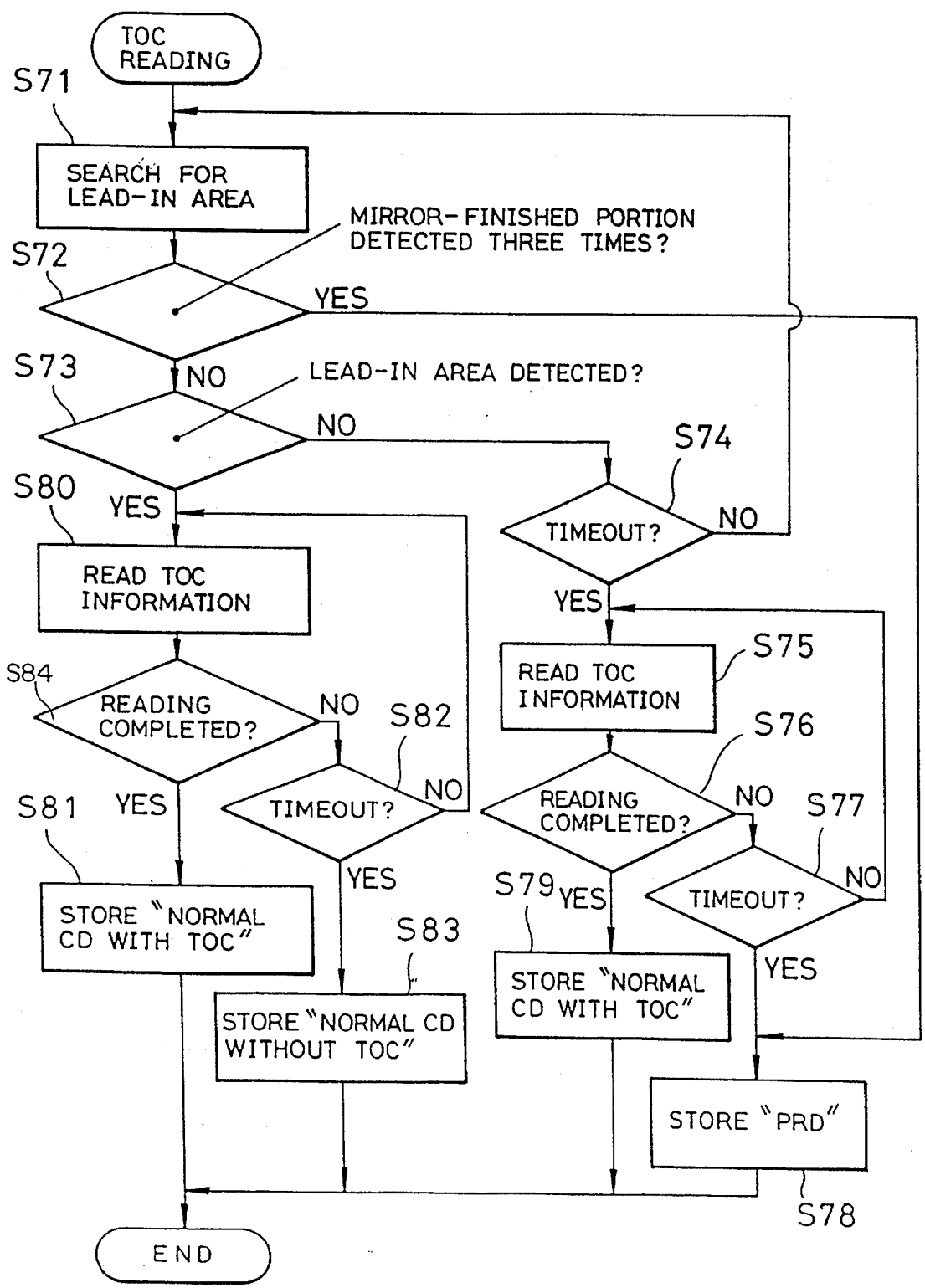
FIG. 9 is a flowchart of a TOC reading routine including disk discriminating means of a first embodiment of the second aspect of the present invention.

FIG. 9 illustrates a flowchart of a process for reading TOC information (TOC reading), which includes the disk discriminating means of the present invention. The TOC reading process of this embodiment will be explained referring to this flowchart.

First, the system controller 7 searches for the lead-in area (step S71). If the reproduced disk is a PRD, the lead-in area is mirror-finished so that the pickup 4 moves on the mirror-finished portion and no servo is enabled, causing runaway of the servo system. At this time, when detecting the runaway of the servo system, the system controller 7 stops the spindle motor 2 and executes the setup operation to search for the lead-in area again. In this embodiment, when searching for the lead-in area results in three runaways of the servo system, it is discriminated that the lead-in area is mirror-finished and the disk is a PRD, and "PRD" is stored as the disk discrimination information (step S72). In this case, the lead-in area is considered as mirror-finished when runaway of the servo system occurs three times in the process of detecting the mirror-finished portion. But as the number of the runaways is determined in consideration of scratches or vibration of the disk, any number can be selected as long as the mirror-finished state is surely detected.

Even if the reproduced disk 1 is a PRD having a mirror-finished lead-in area, when the tracking control of the pickup 4 uses three spot beams, the pickup 4 does not move to the mirror-finished portion, causing no runaway of the servo system. But the lead-in area cannot be searched in this case too, so that timeout occurs. Further, even with a normal CD, if the lead-in area cannot be detected due to scratches or the like on the CD, timeout also occurs (steps S73 and S74). When the lead-in area cannot be detected and timeout occurs, reading TOC information is then conducted (step S75). If the disk is a PRD, the TOC information cannot be read as a matter of course, causing timeout. In this case, therefore, the disk is discriminated as a PRD and "PRD" is stored as the disk discrimination information (steps S76, S77 and S78). When reading the TOC information is possible and is completed, the disk is discriminated as a normal CD from which the TOC information can be read, and "normal CD with TOC" is stored as the disk discrimination information (step S79).

When the lead-in area is detected in step S73, the routine goes to a process of reading TOC information as done in the prior art. If the reading is completed, the disk is discriminated as a "normal CD with TOC", or if the reading cannot be accomplished before the time is out, the disk is discriminated as a "normal CD without TOC", and the discrimination result is stored as the disk discrimination information in each case (steps S80, S81, S82, S83 and S84).

Table 1 below shows the correlation between the conditions and the results of the disk discrimination.

As shown in Table 1, in the disk discrimination of this embodiment, when a normal CD is detected and the lead-in area is detected as mirror-finished, or the lead-in area cannot be detected and TOC information cannot be read, the reproduced disk is discriminated as a PRD and the discrimination result is stored accordingly. It is therefore possible to perform the playback control according to the reproduced disk later, referring to the disk discrimination information. This makes it possible to play back even a PRD having no TOC information and a mirror-finished lead-in area to reproduce information recorded in the program area.

TABLE 1

| Lead-in Area | TOC Reading | Results |
| --- | --- | --- |
| (1) detected | readable | normal CD with TOC |
| (2) detected | timeout | normal CD without TOC |
| (3) timeout | readable | normal CD with TOC |
| (4) timeout | timeout | PRD |
| (5) mirror-finished portion detected | — | PRD |

As described above, the CD player according to the second aspect of the present invention can discriminate a not finalized disk and can perform later playback control according to the disk in use, ensuring the reproduction of recorded information from the additionally recordable disk.

What is claimed is:

1. A CD player for performing a setup operation to ready a pickup to reproduce information recorded on a CD, comprising:

a servo system controlling said pickup; and setup control means for controlling said servo system to perform said setup operation at a first setup position located at an inner periphery of said CD, predetermined for said setup operation, controlling said servo system to again perform said setup operation until said setup operation is completed successfully at any of n-th (n=2, 3, . . . ) setup positions lying outwardly of said first setup position, and, if said setup operation is not completed successfully even at an n-th setup position located at an outer periphery of the CD, controlling said servo system to perform said setup operation again at at least one setup position lying inwardly of said n-th setup position.

2. A CD player capable of executing setup operations in preparation for playback of a disk positioned for playback in the CD player, comprising:

a carriage provided with a pickup for reading the disk;

a servo unit connected to said carriage over a signal path, for driving said carriage; and a system controller connected to said servo unit over a further signal path, for controlling said servo unit;

wherein said system controller is programmed:

to control said servo unit to move said pickup to a first setup position at a predetermined location over the disk;

to execute a first setup operation once said pickup is located at substantially the first setup position;

to determine whether the first setup operation was successfully executed, based on predetermined criteria;

if the setup operation was not successfully executed, controlling said servo unit to move said pickup to a second setup position at another predetermined location over the disk, the second setup position being located a predetermined distance outward in a radial direction relative to the first setup position; and to execute a second setup operation once said pickup is located at substantially the second setup position.

3. A method for executing a setup operation in preparation for playback of a disk, positioned for playback in a CD player, said method comprising the steps of:

moving a pickup of the CD player to a first setup position at a predetermined location over the disk;

executing the setup operation at substantially the first setup position;

determining whether the setup operation was executed successfully according to predetermined criteria;

if the setup operation was not executed successfully, moving the pickup to a second setup position at another predetermined location over the disk, the second setup position being located a predetermined distance outward in a radial direction relative to the first setup position; and executing the setup operation at substantially the second setup position.

4. The method according to claim 3, further comprising the step of:

determining whether the setup operation at substantially the second setup position was executed successfully according to the predetermined criteria; and if the setup operation at substantially the second setup position was not executed successfully, moving the pickup to a third setup position at a further predetermined location over the disk.

5. The method according to claim 4, wherein the third setup position is located a predetermined distance outward in a radial direction relative to the second setup position.

6. The method according to claim 4, wherein the third setup position is located a predetermined distance inward in a radial direction relative to the second setup position.

7. The method according to claim 4, wherein the third setup position corresponds in location substantially to the first setup position.

8. The method according to claim 3, wherein the setup operation comprises:

activating a laser housed in the pickup; and activating focusing, tracking and synchronization servos housed in the CD player.

\* \* \* \* \*